(12) United States Patent
Caspari et al.

(10) Patent No.: US 9,127,789 B2
(45) Date of Patent: Sep. 8, 2015

(54) FIXING SYSTEM FOR CABLES, IN PARTICULAR IN WIND TURBINES

(75) Inventors: Jochen Caspari, St. Wendel (DE); Burhan Yagci, Sulzbach (DE); Peter Maryniok, Mettlach (DE)

(73) Assignee: Hydac Accessories GmbH, Sulzback/Saar (DE)

( * ) Notice: Subject to any disclaimer, the term of this patent is extended or adjusted under 35 U.S.C. 154(b) by 0 days.

(21) Appl. No.: 13/261,710

(22) PCT Filed: Jan. 5, 2012

(86) PCT No.: PCT/EP2012/000034
§ 371 (c)(1),
(2), (4) Date: Oct. 21, 2013

(87) PCT Pub. No.: WO2012/113491
PCT Pub. Date: Aug. 30, 2012

(65) Prior Publication Data
US 2014/0034789 A1    Feb. 6, 2014

(30) Foreign Application Priority Data
Feb. 25, 2011   (DE) .......................... 10 2011 012 391

(51) Int. Cl.
| F16L 3/22 | (2006.01) |
| F16L 3/227 | (2006.01) |
| F03D 11/00 | (2006.01) |
| H02G 3/30 | (2006.01) |
| F16L 3/00 | (2006.01) |

(52) U.S. Cl.
CPC ............. *F16L 3/227* (2013.01); *F03D 11/0066* (2013.01); *H02G 3/30* (2013.01); *F05B 2250/141* (2013.01); *Y02E 10/722* (2013.01)

(58) Field of Classification Search
CPC ....... F03D 11/0066; H02G 3/30; F16L 3/227; F16L 3/08; F16L 3/22; B25B 5/068; B25B 5/082; B25B 5/101; B25B 5/125; B25B 27/00; B25B 28/00; Y10T 24/3439
USPC .............. 248/62, 63, 68.1, 70, 71, 74.2, 554, 248/555–557; 174/665, 650, 144, 503; 269/3, 6, 143, 249
See application file for complete search history.

(56) References Cited

U.S. PATENT DOCUMENTS

| 896,798 A | * | 8/1908 | Brown | .......................... 248/74.2 |
| 1,452,497 A | * | 4/1923 | Fischer | ......................... 248/68.1 |

(Continued)

FOREIGN PATENT DOCUMENTS

| DE | 10 2011 07690 A1 | 12/2011 |
| GB | 2 478 772 A | 9/2011 |
| WO | WO 00/79660 A1 | 12/2000 |

*Primary Examiner* — Jonathan Liu
*Assistant Examiner* — Muhammad Ijaz
(74) *Attorney, Agent, or Firm* — Roylance, Abrams, Berdo & Goodman LLP

(57) ABSTRACT

A fixing system for cables, in particular in wind turbines, includes a main body (1) that can be fixed to a supporting structure and cable holders (11) that have an opening for cables to be inserted. Each opening can be closed by a cover device (45). The cable holders (11) are mounted on the main body (1) and in an arrangement extending at least over a part of a circle with the opening of the cable holders on the outside. The cover device includes retaining elements (45), by which the opening of the respective cable holders (11) can be blocked to secure inserted cables.

9 Claims, 7 Drawing Sheets

(56) References Cited

U.S. PATENT DOCUMENTS

| | | | |
|---|---|---|---|
| 2,179,406 A * | 11/1939 | Fitzpatrick | 248/68.1 |
| 2,394,240 A * | 2/1946 | Harrison | 248/68.1 |
| 2,419,761 A * | 4/1947 | Bruce | 248/68.1 |
| 2,470,814 A * | 5/1949 | Hain | 248/68.1 |
| 3,054,587 A | 9/1962 | Hebenstreit et al. | |
| 4,386,752 A * | 6/1983 | Pavlak et al. | 248/73 |
| 4,813,639 A * | 3/1989 | Midkiff et al. | 248/68.1 |
| 5,257,768 A | 11/1993 | Juenemann et al. | |
| 5,320,312 A * | 6/1994 | Hoenninger | 248/68.1 |
| 6,269,524 B1 * | 8/2001 | Cassel | 24/279 |
| 8,020,259 B2 * | 9/2011 | Ho et al. | 24/129 R |
| 8,664,544 B2 * | 3/2014 | Even et al. | 174/665 |
| 2007/0007397 A1* | 1/2007 | Nelson | 248/68.1 |
| 2007/0120023 A1* | 5/2007 | Martinez et al. | 248/75 |
| 2007/0278358 A1 | 12/2007 | Clark | |
| 2009/0272576 A1 | 11/2009 | Medina | |

* cited by examiner

FIXING SYSTEM FOR CABLES, IN PARTICULAR IN WIND TURBINES

FIELD OF THE INVENTION

The invention relates to a fixing system for cables, in particular in wind turbines, having a main body that can be fixed to a supporting structure and that has cable holders. The cable holders have openings for the insertion of cables, with each opening able to be sealed by a cover device.

BACKGROUND OF THE INVENTION

To discharge the energy generated in wind turbines, as well as for other operational purposes such as control, monitoring and the like, cables extending though the tower into the nacelle must be reliably fastened to the appropriate supporting structures, in particular to the tower segments. Fastenings with clamp-like main bodies in which inserted cables can be secured are typically used for this purpose. Fixing systems of this kind in which a corresponding number of screwing procedures must also be carried out, require a high degree of assembly expenditure. This expenditure applies in particular to the fastening of cables that must be routed from below, through the tower to the nacelle and connected to the generator unit. In the case of conventional wind turbines, this generator unit may need to be rotated together with the nacelle for up to three turns before the nacelle is steered back. For the cables to be able to make this movement as well, they are routed over a cable loop hanging in the tower. To prevent the cables from rubbing against one another during the rotational movements, the cables must be kept at a distance here. Cables are therefore typically held by a round supporting structure, for example in the form of a tubular piece, around which the cables are distributed and fastened using simple clamps. Mountings of this kind are costly and tedious.

SUMMARY OF THE INVENTION

An object of the invention is to provide an improved and especially suitable fixing system for cables.

This objective is basically achieved according to the invention by a fixing system comprising cable holders provided in the form of components that can be mounted on a main body and are disposed on the main body in an arrangement extending at least over a part of a ring with the openings of the cable holders on the outside. A cover device has retaining elements. The openings of the cable holders can be blocked by the retaining elements to fasten, in particular to pre-fasten, the inserted cables.

The annular arrangement of the cable holders allows the cables to be fixed in a cable loop hanging from the nacelle in the tower such that those cables are positioned and distanced from one another as in the tower segments themselves. Chafing of the cables can then be avoided in any event. The fact that further cable holders are provided in the form of components that can be mounted on the main body provides the advantageous possibility of realizing a fixing system that can tolerate especially high loads with little design effort and at a low cost. In the case of separate cable holders that can be attached to the main body, different materials can be used for these cable holders and the main body. Thus cable holders can be efficiently and cost-effectively molded out of a plastic material, for example, while the main body can be formed as a metal structure, for instance in the form of a steel structure with a high degree of structural stability, i.e. it can be designed for optimal stability without having to forgo the use of cable holders made out of inexpensive materials. According to the invention, retaining devices are also available as an element of the cover device. By the retaining devices, the insertion opening can be blocked to pre-fasten the cables inserted into the cable guides of the cable holders, allowing the cables to be readily inserted into the cable guides, one after the other, since they are secured against falling out.

Since the cover device preferably also has a band clamp, which band clamp exerts the retaining force on the cables via the retaining devices, only a single screwing procedure is needed to tension the band clamp to secure the total number of cables held in the annular arrangement. A retaining force can also be exerted on the received cables by the cover device, if necessary.

In especially advantageous embodiments, the main body comprises a steel band positioned between end sections that form attachment points for anchoring on the supporting structure. The steel band extends preferably as a part of an arc that forms a circular ring, along which a row of cable holders is mounted. This kind of steel supporting structure ensures that the cables are securely anchored, even if the cable holders are made of a lower strength material such as plastic.

An overall structure with an especially high degree of stability can be achieved with a cross-member in the form of an axis extending through the inside of the arc. The cross-member penetrates the band of the are on both sides between the end sections that serve as anchoring sites and the respective end of the row of cable holders and projects outward. The projecting ends of the cross-member each form a point of application for the band clamp. Such cross-member, in particular if it is welded to the band at the penetration points through the band, forms a particularly effective reinforcement of the arc that runs semicircularly, for example, so that a high degree of stability is assured with a low material cost. At the same time, due to the cross-member, points of application for the band clamp are available, to which the clamping force can be introduced into the structure with force components that predominantly run longitudinally with respect to the band and therefore with greater operational reliability.

In especially preferred embodiments, the cross-member is formed by a steel rod, with a rectangular cross section and a long side extending in the circumferential direction of the arc and passing through a slot in the bracket band arc. In this arrangement, the clamping force of the band clamp is exerted in the direction of the long sides of the rectangular profile, thus in the direction of the greater bending resistance of the cross-member.

Each cable holder is preferably individually connected to the band of the main body, and each has a trough-shaped cable guide.

Particularly advantageously, the cable holders can have a curved base corresponding to the curvature of the band for installation on the band. A catch mechanism is formed between this curved base and the band to secure the cable holders on the main body. Such system is characterized by an especially low degree of installation effort.

The exact orientation of the cable holders on the band is very easy to achieve when the cable holders are disposed between positioning fittings. The position fittings extend radially in a row in the circumferential direction of the band from the circular arcuate band and engage with guide channels formed by recesses in the side walls of the cable holders in a fitted manner. The positioning fittings also serve to accept forces exerted between the cable holders and main body.

In especially preferred embodiments, the retaining devices are pivotably mounted on the edge of the opening of the trough-shaped cable guides of the cable holders such that the retaining devices can be moved between an insertion position that can be turned away from the opening and a pre-fastening position securing the inserted cables. A locking device secures the cable holders in the pre-fastening position and is provided between the cable holders and retaining devices. The retaining devices are secured to the respective cable holder by the pivotal mounting of the retaining devices on the cable holder so that they are non-detachable and need not be handled separately for each assembly process.

In especially advantageous embodiments, the retaining devices have a cover member that is hinged on the cable holder and forms a support surface on its upper side for the band clamp. A displaceable clamping member on the cover member is advanced by a spring arrangement in the direction of the received cable. If necessary, a pre-clamping force can also be realized in such a way.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
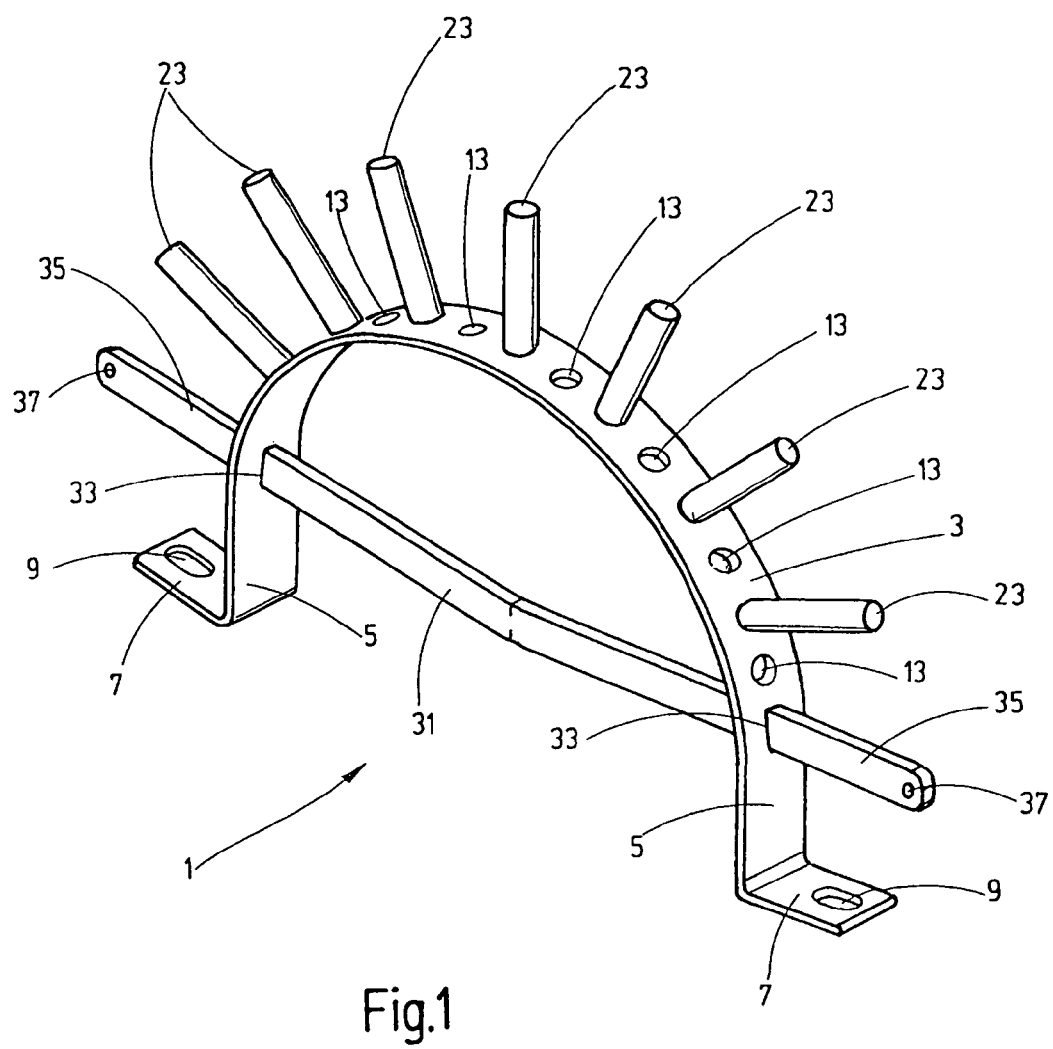
FIG. 1 is a perspective of a main body only of a fixing system according to a first exemplary embodiment of the invention, without cable holders attached to the main body.

FIG. 1 separately shows the main body 1 of an embodiment to be described, without attached cable holders. The main body 1 is a steel structure comprising a steel band 3 that is bent into a semicircle between the end sections 5. At the end sections 5, angled brackets 7 with elongated holes 9 serve to anchor the main body 1 to a supporting structure. The brackets 7 are angled in relation to the end sections 5 to match the curvature of the tower wall to allow the brackets to be attached to the inner surface of a tower wall in wind turbines. In the present example, the arc of the band 3 extending between the end sections 5 forms the mount for eight cable holders that are not shown in the depiction of the main body 1 in FIG. 1. The cable holders 11 are shown in FIGS. 2-5. To attach the cable holders 1 to the band 3 of the main body 1, the band 3 has fastening holes 13 so that each cable holder 11 can be attached equally spaced along the circular arc. Each fastening hole 13 serving as a catch mechanism with the cable holder 11, in which a snap-in connection with a snap-in ridge 15 (FIGS. 4 and 5) is formed, which snap-in ridge 15 projects from the base 17 (FIG. 5) of the respective cable holder 11. As can be most clearly seen in FIG. 5, the base 17 has a curvature adapted to the circular arc of the band 3. FIG. 4 shows the formed snap-in connection.

Figure 2:
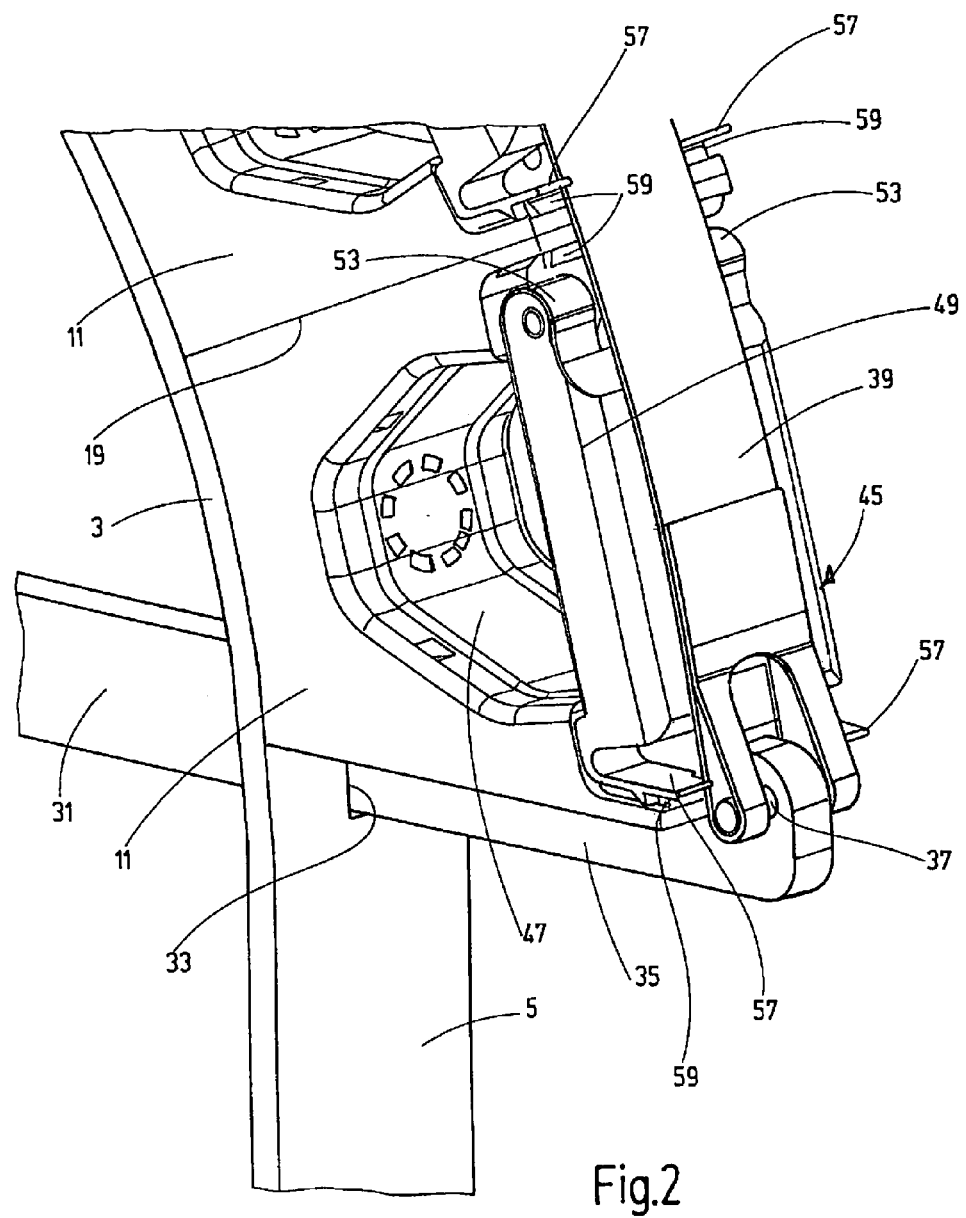
FIG. 2 is an enlarged and partial perspective view of the fixing system of FIG. 1 showing only one last cable holder and part of one preceding cable holder from a row of cable holders attached to the main body.
Figure 3:
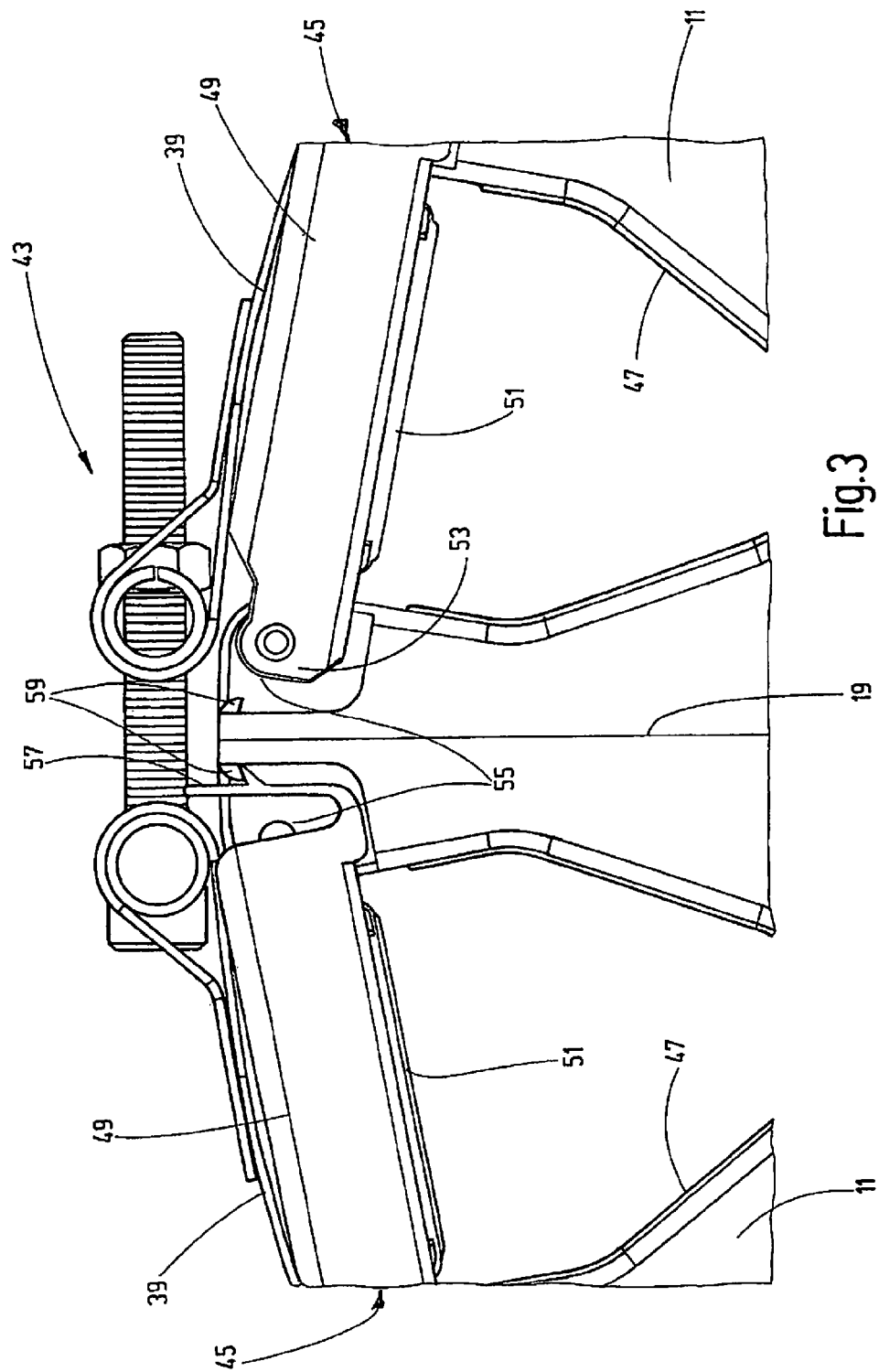
FIG. 3 is an enlarged and partial front elevational view of the fixing system of FIG. 1 showing two successive cable holders.
Figure 4:
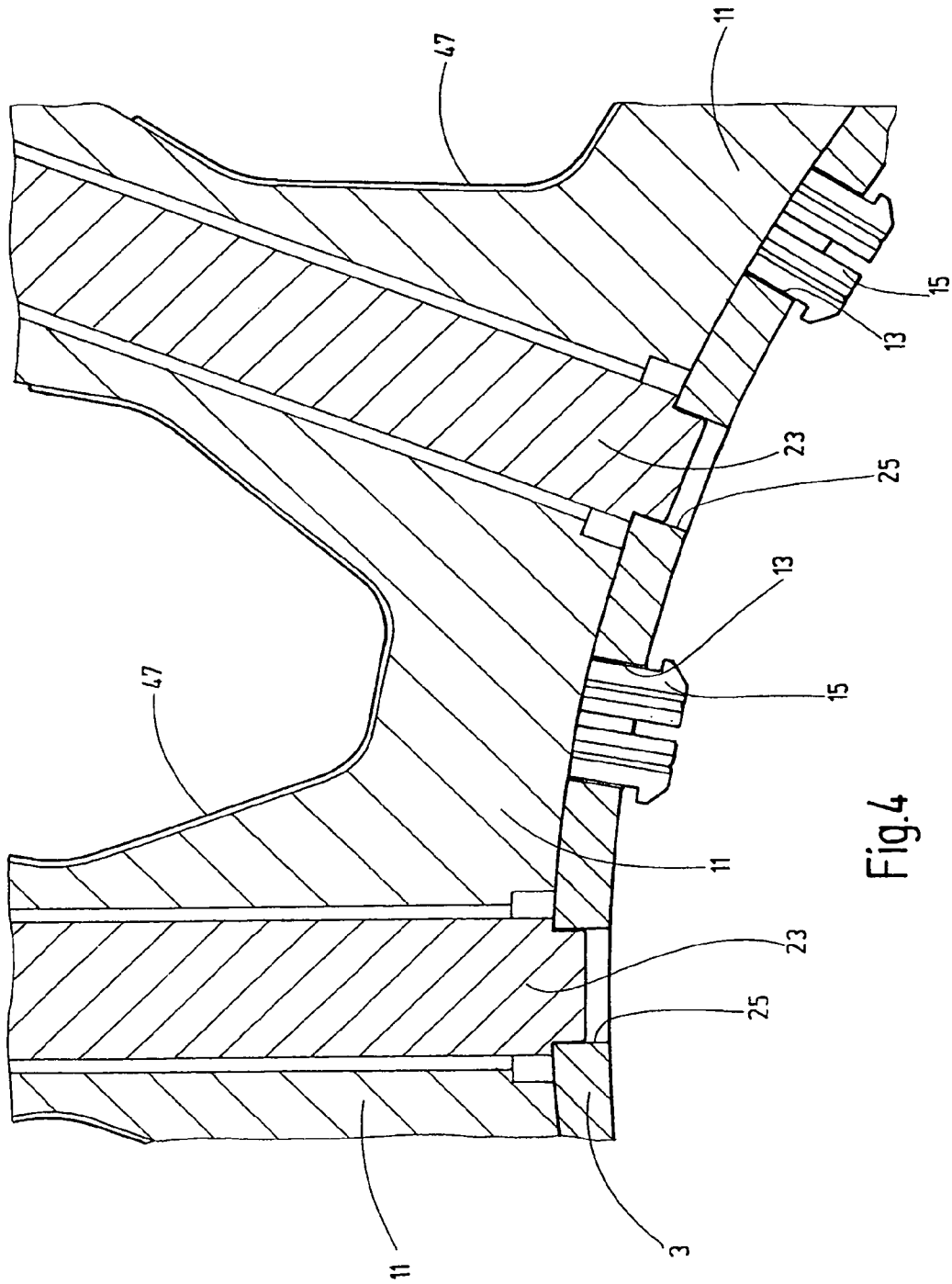
FIG. 4 is an enlarged and partial front elevational view in section of the fixing system of FIG. 1.
Figure 5:
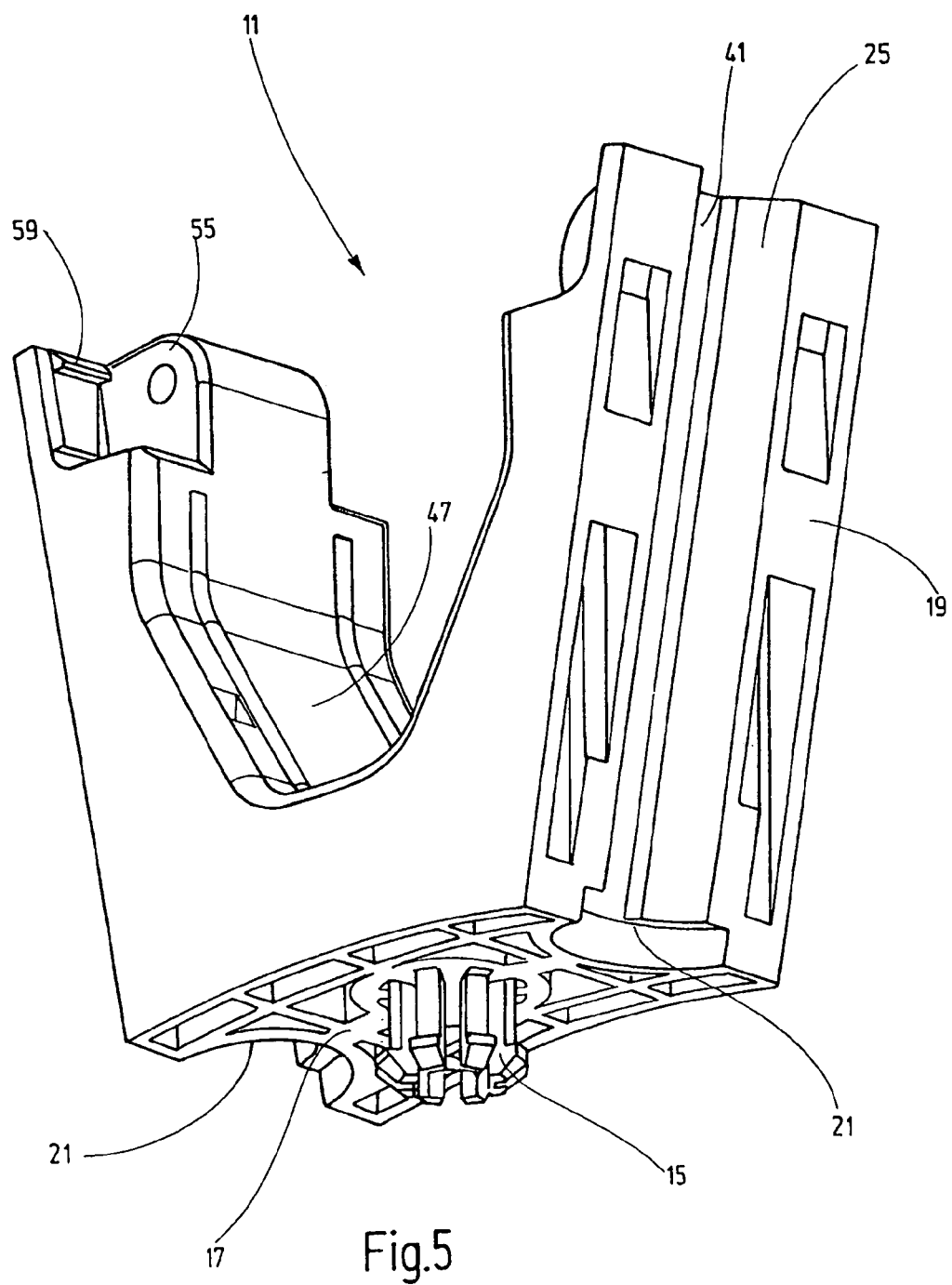
FIG. 5 is an enlarged perspective view of an individual cable holder of the fixing system of FIG. 1.

As shown in FIGS. 2 and 3, when the cable holders 11 are attached to the band 3, they lie with their side surfaces 19 (FIG. 5) flush with one another so that the cable holders 11 on the main body 1 form an uninterrupted arcuate row. As shown in FIG. 5, continuous recesses 21 are located in the side surfaces 19 of the cable holders 11 from the base 17 to the upper end. The recesses are formed such that when the side surfaces 19 of two consecutive cable holders 11 lie flush against one another, positioning fittings can be appropriately accommodated in the recesses 21. Here, this accommodation involves cylindrical studs 23 that sit, are pressed, welded or glued in the stud holes 25 (FIG. 4) of the band 3, and that extend radially from the arc of the band 3. The recesses 21 in the cable holders 11 have an inner partial cylindrical surface 25 fitted to the studs 23. The positioning fittings may also have another cross-sectional shape.

As shown in FIG. 1, a cross-member 31 extends through the arc of the band 3 in the manner of a bowstring. The cross-member is formed by a steel rod having a rectangular cross section and passes through slots 33 in the band 3. The end sections 35 of the cross-member extend outward in a radial direction relative to the circular arc of the band 3. An anchoring point 37 for a respective end of the band clamp 39 is formed at the end sections 35 of the cross-member 31. The band clamp 39 encircles the row of cable holders 11 (see FIGS. 2 and 3). The cross-member 31 is guided in an orientation through the slots 33 of the band 3 such that the long sides of the rectangular profile face the circumferential direction of the band 3, and the cross-member 31 thereby counteracts the higher bending resistance of the tensile force of the band clamp 39 exerted in the circumferential direction. In the row of cable holders 11 disposed along the arc of the band 3, the two end sections 35 of the cross-member 31 each replace the outer positioning studs 23 of the respective final cable holder 11. Adapted to the rectangular shape of these end sections 35, a further recessed groove 41 (FIG. 5), connecting to the partial cylindrical surface 25, is located in the respective recess 21 of the side surface 19 of the cable holders 11 at the bottom of the recess 21. The end section 35 of the cross-member 31 suitably engages recessed groove 4.

As shown in FIGS. 1, 2 and 3, the band clamp 39 can be tensioned by a turnbuckle 43 (FIG. 3) corresponding to the prior art, and is in contact with the upper side of the retaining devices 45. The cable holders 11 each have a trough-shaped cable guide 47 that tapers towards the bottom of the trough. The upper end of cable guide 47 has an insertion opening for inserting the cable (not shown). The retaining devices 45 have a lower clamping member 51 below an upper cover member. The upper cover member forms the contact surface for the band clamp 39 on its upper side. In the operating state shown in FIGS. 2 and 3, this lower clamping member 51 extends over the insertion opening of the respective cable guide 47, exerting force on the inserted cables.

The retaining devices 45 have hinge plates 53 on one side of the cover member 49 thereof. With those hinge plates 53, the retaining devices can be pivoted, as on a hinge, on a swivel bearing 55 located on the cable holders 11 at the insertion opening thereof. Compared to the position shown in FIGS. 2 and 3, the retaining devices 45 can therefore be pivoted up into an insertion position, so that the cables can be inserted into the cable guides 47 before the band clamp 39 is applied, closed, and tensioned. Once the insertion process has been carried out at the respective cable holder 11, the retaining devices 45 are pivoted from the insertion position into a pre-fastening position on the cable holder 47. In this pre-fastening position, the retaining devices 45 can each be secured by flexible snap-in tongues 57 formed on the cover member 49 on the side opposite the hinge plates 53. These snap-in tongues 57 engage with snap-in tabs 59 on the cable holders 11. After the retaining devices 45 are thus pre-fixed, the band clamp 39 is guided over the cover members 49 of the retaining devices 45 and tensioned by the turnbuckle 53. If the retaining devices 45 can be held in a position, defined by a snap-in or other immobilizing connection, that closes or blocks the cable holders 11. In one embodiment, not depicted here, the band clamp can be omitted entirely.

Figure 6:
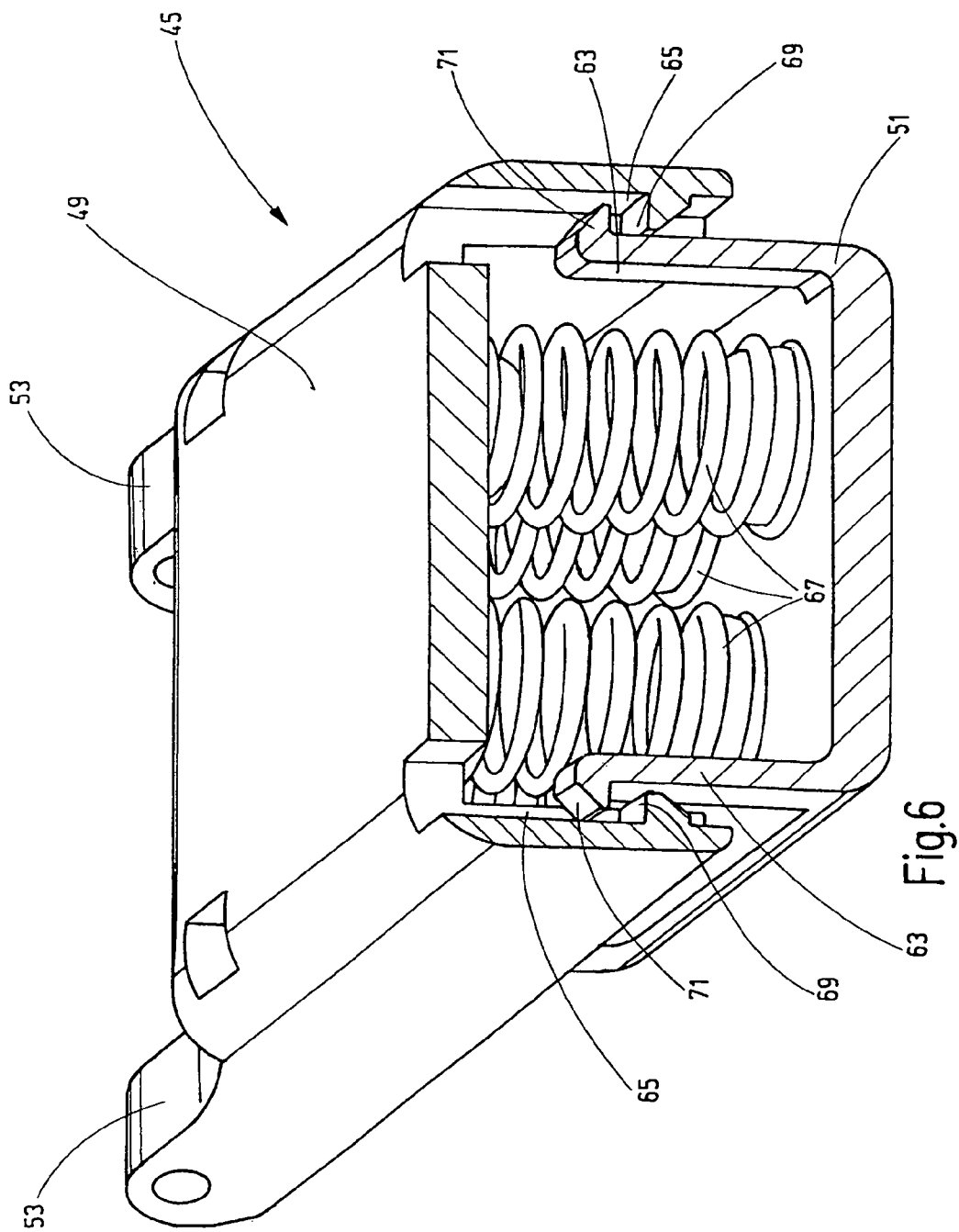
FIG. 6 is an enlarged perspective view in section of an individual retaining device of the fixing system of FIG. 1.

FIG. 6 illustrates an embodiment of the retaining devices 45. Instead of forming these retaining devices as a one-piece component, for example as a molded part made of plastic, the retaining devices 45 can have a clamping member 51 that is relatively movable with respect to the cover member 49, as shown in FIG. 6. In this case, the clamping member 51 has the form of a rectangular plate, from the corner regions of which guide bars 63 extend in the direction of the cover member 49 and are guided so that they can be displaced in guide surfaces 65 in the cover member 49. A compound spring comprising multiple compression springs 67 is inserted between clamping member 51 and the cover member 49. The compression springs bias the clamping member 51 to advance in the direction of the cable to their positioning. To limit the spring deflection and to prevent the escape of the clamping member 51 from the formed spring case under the load of the compound spring, end stop projections 69 and 71 are provided on the guide 65 on the cover member 49 and on the guide bars 63 of the clamping member 51, respectively.

Due to the rigid steel structure forming the main body 1, the cable holders 11, the retaining devices 45, as well as the positioning studs 23, can be made out of a low cost material that allows efficient production, for example out of molded plastic.

Figure 7:
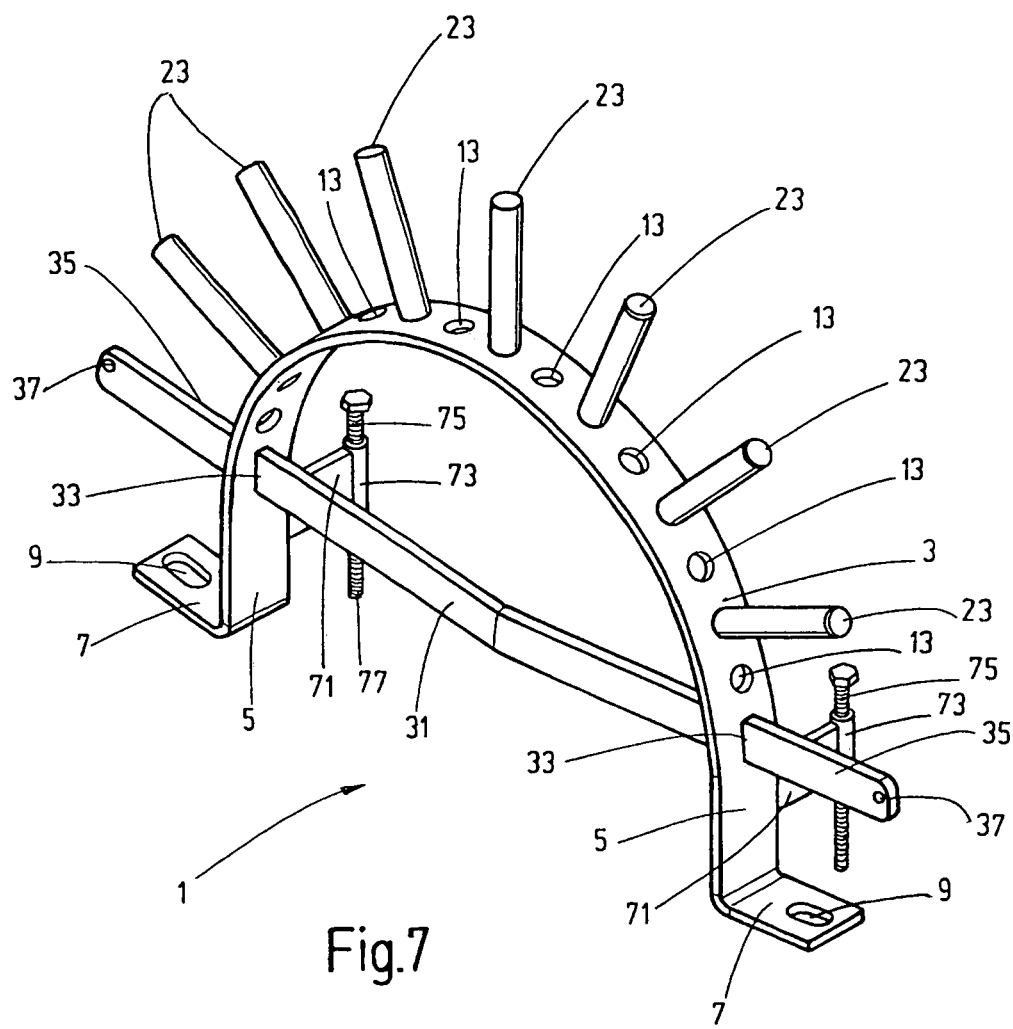
FIG. 7 is a perspective view of a main body only of a fixing system according to a second exemplary embodiment of the invention, without cable holders attached to the main body.

FIG. 7 shows a separate depiction of the main body of a modified embodiment. In contrast to the above-described example, an alignment device is provided on the main body 1. This alignment device is provided in particular for applications in which the main body 1 is to be mounted on the inner wall of a conically formed tower segment in a wind turbine. The tower segment tapers in diameter to the nacelle so that the inner wall has a sloping gradient relative to the vertical. The orientation of the plane of the arc 3 can be aligned with the cable holders 11 in an orientation that is adapted to the respective wall inclination by this alignment device.

To this end, the alignment device has cantilevers 71 extending from the end sections 5 of the band 3 in the same respective direction. At the end of each cantilever 71, a threaded sleeve 73 is located. An adjustment screw 75 located in each threaded sleeve 73. The free end 77 of each screw is supported on the inner wall of the tower segment in question and allows the desired position of the level of the arc 3 to be adjusted relative to the tower wall.

While various embodiments have been chosen to illustrate the invention, it will be understood by those skilled in the art that various changes and modifications can be made therein without departing from the scope of the invention as defined in the appended claims.

What is claimed is:

1. A fixing system for cables, comprising:
a main body including a steel band extending between end sections of said steel band with attachment points anchorable to a supporting structure, said steel band extending as part of an arc of a circle;
a plurality of positioning fittings extending radially outwardly from said arc of said steel band and in a row in a circumferential direction on said steel band;
a plurality of cable holders mounted on said steel band and arranged on said steel band to extend over at least a part of said steel band in said row, each said cable holder having an opening on an outside thereof for receiving at least one cable, each said cable holder having guide channels formed by recesses in side walls of the respective cable holder, each said recess partially receiving the respective positioning fitting; and
retaining elements coupled to said cable holders for blocking said openings in said cable holders to secure inserted cables.

2. A fixing device according to claim 1 wherein
a band clamp encircles said cable holders and secures said retaining elements in said cable holders.

3. A fixing device according to claim 2 wherein
a cross-member extends along an axis inside said arc, penetrates said steel band on both sides thereof between each said end section and a respective end of said row of said cable holders, and projects outwardly from said steel band forming projecting ends, said projecting ends having application points connected to ends of said band clamp.

4. A fixing device according to claim 3 wherein
said cross-member comprises a steel rod having a rectangular cross section with a long side thereof extending in a circumferential direction of said arc, said steel rod passing through in said steel band.

5. A fixing device according to claim 1 wherein
each said cable holder is individually connected with said steel band and comprises a trough-shaped cable guide.

6. A fixing device according to claim 1 wherein
each said cable holder comprises a curved base with a curvature corresponding to a curvature of said steel band; and
a catch mechanism is between each said curved base and said steel band securing each said cable holder to said steel band.

7. A fixing device according to claim 1 wherein
said retaining elements are pivotally mounted on edges of said openings of trough-shaped cable guides in said cable holders allowing movement of said retaining elements between insertion positions away from said openings and pre-fastening positions closing said openings and securing inserted cables; and
locking devices secure said retaining elements in the pre-fastening positions on said cable holders.

8. A fixing device according to claim 7 wherein
a band clamp encircles said cable holders and secures said retaining elements in said cable holders; and
each said retaining element comprises a cover member hinged on the respective cable holder and having a support surface on an outer side thereof engaging said band clamp, and comprises a displaceable clamping member coupled to said cover member thereof.

9. A fixing device according to claim 8 wherein
a spring arrangement between each said cover member and the respective clamping member biases respective clamping member in a direction of a cable received in the respective cable holder.

* * * * *